United States Patent
Knowles et al.

(10) Patent No.: US 8,782,376 B2
(45) Date of Patent: Jul. 15, 2014

(54) VECTOR INSTRUCTION EXECUTION TO LOAD VECTOR DATA IN REGISTERS OF PLURAL VECTOR UNITS USING OFFSET ADDRESSING LOGIC

(75) Inventors: Simon Knowles, Bath (GB); Edward Andrews, Bristol (GB); Stephen Felix, Bristol (GB); Simon Huckett, Bristol (GB); Colman Hegarty, Bristol (GB)

(73) Assignee: Icera Inc., Wilmington, DE (US)

( * ) Notice: Subject to any disclaimer, the term of this patent is extended or adjusted under 35 U.S.C. 154(b) by 239 days.

(21) Appl. No.: 13/219,321

(22) Filed: Aug. 26, 2011

(65) Prior Publication Data

US 2012/0221834 A1 Aug. 30, 2012

(51) Int. Cl.
| | | |
|---|---|---|
| G06F 9/312 | (2006.01) |
| G06F 9/38 | (2006.01) |
| G06F 9/30 | (2006.01) |
| G06F 9/345 | (2006.01) |

(52) U.S. Cl.
CPC .......... *G06F 9/30043* (2013.01); *G06F 9/3889* (2013.01); *G06F 9/30163* (2013.01); *G06F 9/30185* (2013.01); *G06F 9/345* (2013.01)
USPC .............................. 712/4; 712/222; 712/225

(58) Field of Classification Search
None
See application file for complete search history.

(56) References Cited

U.S. PATENT DOCUMENTS

| | | | | |
|---|---|---|---|---|
| 5,537,606 A | * | 7/1996 | Byrne | ................................ 712/7 |
| 6,574,724 B1 | | 6/2003 | Hoyle et al. | |
| 7,434,024 B2 | * | 10/2008 | Selvaggi et al. | ............... 711/203 |
| 8,161,266 B2 | * | 4/2012 | Colavin | ............................ 712/9 |
| 2003/0037221 A1 | | 2/2003 | Gschwind et al. | |
| 2005/0044342 A1 | | 2/2005 | Wilson | |
| 2007/0214319 A1 | | 9/2007 | Wilson | |

OTHER PUBLICATIONS

Kubiatowicz, J., "Vector Processing," CS252 Graduate Computer Architecture Lectures 11 and 12, 2007, 24 pages.
Yu, J. K. K., "Vector Processing as a Soft-core Processor Accelerator," Electronic Thesis, The University of British Columbia, Jun. 2008, 88 pages, http://hdl.handle.net/2429/2394.
Translation of German Office Action dated Dec. 20, 2012, Application No. 102011081585.6, 8 pages.

* cited by examiner

Primary Examiner — Kenneth Kim (57) ABSTRACT

A processor including: a first and at least a second data processing channel with enable logic for selectively enabling the second channel; logic for generating first and second storage addresses having a variable offset therebetween based on the same one or more address operands of the same storage access instruction; and circuitry for transferring data between the first address and a register of the first data processing channel and between the second address and a corresponding register of the second channel based on a same one or more register specifier operands of the access instruction. The first data processing channel performs an operation using one or more registers of the first data processing channel, and on condition of being enabled the second channel performs the same operation using a corresponding one or more of its own registers based on the same one or more operands of the data processing instruction.

41 Claims, 4 Drawing Sheets

VECTOR INSTRUCTION EXECUTION TO LOAD VECTOR DATA IN REGISTERS OF PLURAL VECTOR UNITS USING OFFSET ADDRESSING LOGIC

CROSS-REFERENCE TO RELATED APPLICATION

This application claims the benefit of GB Application No. 1014318.8 filed on Aug. 27, 2010, entitled "IMPROVED PROCESSOR ARCHITECTURE," commonly assigned with this application and incorporated herein by reference.

TECHNICAL FIELD

This application relates to an improved architecture for increasing the data computation performance of a processor.

BACKGROUND

Figure 1:
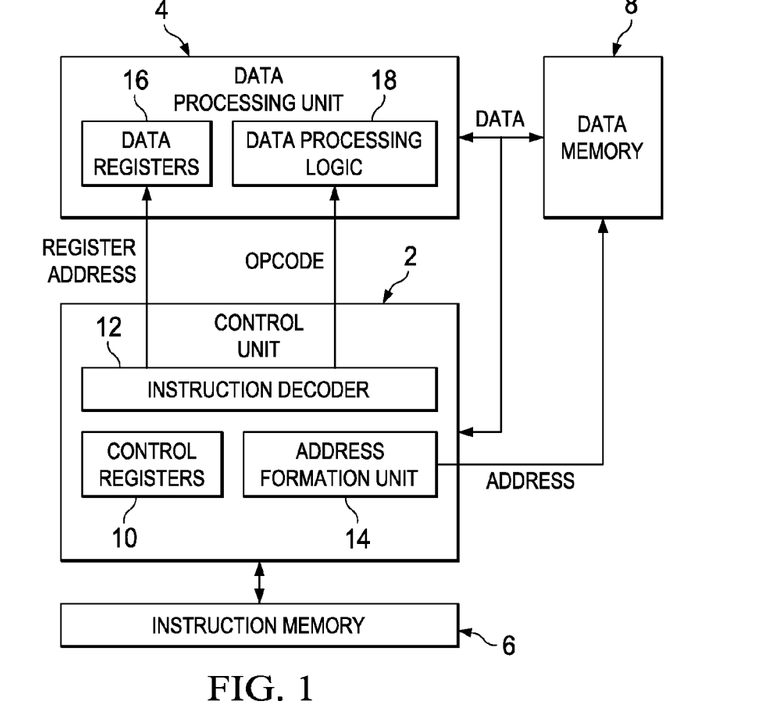
FIG. 1 is a schematic block diagram of a known processor.

FIG. 1 is a schematic block diagram illustrating a known processor architecture. The processor may employ a dual path architecture whereby the processor comprises two different separate hardware execution paths: a control execution path in the form of a control unit 2 which is dedicated to processing control code, and a data execution path in the form of a data processing unit 4 which is dedicated to processing data. The distinction between data and control processing will be discussed shortly. An exemplary instance of such an architecture is described for example in international patent application publication number WO 2005/096141.

In the illustrated processor, the control unit 2 is coupled to an instruction memory 6, which may be integrated onto the same chip as the processor or alternatively connected off-chip. Each of the control unit 2 and the data processing unit 4 is coupled to a data memory 8, which again may be integrated onto the same chip as the processor or alternatively be connected off-chip. The control unit 2 comprises a set of control registers 10, an instruction decoder 12, and an address formation unit 14. An exemplary control unit will also have control processing logic, not shown, e.g. for performing branch operations, and may also have scalar data processing logic. The data processing unit 4 comprises a set of data registers 16 and data processing logic 18. A set of registers is sometimes called register file. The instruction decoder 12 is coupled to the data registers 16 and to the data processing logic 18, as well as being coupled to the instruction memory 6 via fetch circuitry (not shown). The instruction decoder 12 is further coupled to the internal logic of the control unit 2, including being coupled to the control registers 10 and address formation unit 14. Each of the address formation unit 14 and the set of control registers 10 is also coupled to the data memory 8.

In operation, the fetch circuitry (not shown) fetches a sequence of instructions from the instruction memory 6 into the instruction decoder 12. The instruction decoder 12 decodes each instruction in the sequence and, depending on the decoded opcode contained within the instruction, determines which unit is required to execute the instruction. The processor thus executes a mix of three types of instruction, as follows:
  (i) control instructions such as branches, which are executed by the control unit 2;
  (ii) data processing instructions, which are decoded by the control unit 2 but then passed (as register addresses and opcodes) to the data processing unit 4 for execution; and
  (iii) memory access instructions (loads and stores), for which the control unit 2 computes memory addresses of the data memory 8, and the corresponding memory data is then transferred to or from either the control registers 10 or the data registers 16.

The term "control" as used herein refers to program flow control, including branching and address generation, and some logic and arithmetic for that purpose. In contrast, the phrase "data processing" or similar as used herein refers to other arithmetic and logical operations to be performed on data that is the subject of the program, i.e. data representing something other than the control flow of the program itself. Data processing in this sense does not include flow control (but may generate results which are used to make control flow decisions, e.g. branch conditions). For example, in the case of a software modem for wireless communication, the data may represent signals received or to be transmitted over an air interface, and the data processing operations may comprise signal processing operations. The results of such signal processing may be supplied to the control unit to allow it to make control flow decisions (e.g. as to what further signal processing is necessary), but the control flow itself (including the sequence of program branches and memory addresses) is effected by the control unit. As another example, the data could represent information from a peripheral device, or information to be output to manipulate a peripheral device. Typically the distinction between the control and data paths is manifested in that control unit 2 uses only scalar processing whereas the data processing unit 4 is configured to use vector processing (see below). In some applications some data processing in fact may be executed on the control path, although control flow code would not be executed on the data processing path.

Memory access instructions such as loads and stores may be considered a third type of instruction, in addition to control instructions and data processing instructions, which can act on the control unit 2 or both the control unit 2 and data processing unit 4.

Figure 2A:
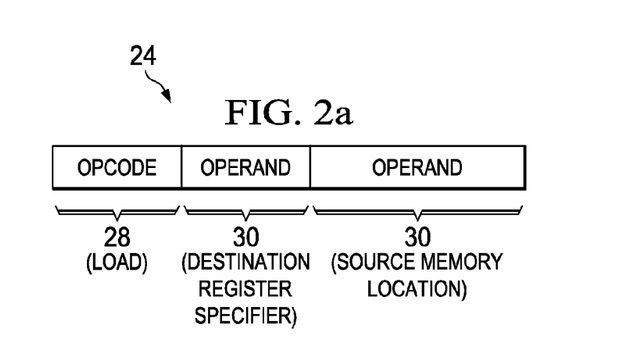
FIG. 2a is a schematic representation of a load instruction.
Figure 2B:
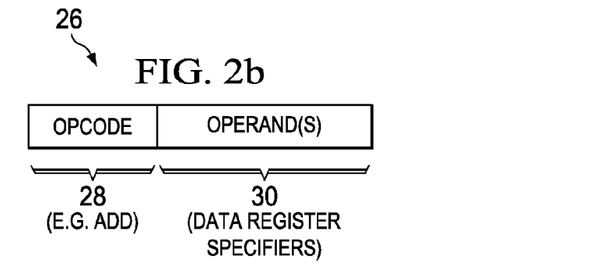
FIG. 2b is a schematic representation of a data processing instruction.

As illustrated schematically in FIGS. 2a and 2b, each instruction comprises an opcode 28 and one or more associated operands 30 (or in the case of a few kinds of instruction it is possible that no operand is required). The opcode is a sequence of bits which when decoded by the instruction decoder 12 indicates the kind of operation to be performed. The one or more associated operands are a sequence of bits which when decoded by the instruction decoder 12 indicates the data to be operated on by that operation, usually by specifying a register and/or memory location where the subject data is currently being held, and depending on the kind of instruction a register and/or memory location for storing the result of the operation.

Data is loaded from the data memory 8 into the control registers 10 or data registers 16 by means of one or more load instructions (a type of memory access instruction). A load instruction 24 is illustrated schematically in FIG. 2a. It comprises an opcode 28 that when decoded indicates a load operation, and two operand fields 30. The first operand field comprises one or more destination operands and the second operand field comprises one or more source operands. For example, the source memory location is more usually indicated by two register addresses, the registers providing a base and an offset which when added together point to the memory location—this is the purpose of the address formation unit 14. Sometimes the offset is an immediate value instead of a register address. The source operand field specifies a memory location from which to take data, and the destination operand field specifies a register into which to place that data.

When loading to the control registers 10, load instructions act on only the control unit 2. The address formation unit 14 computes the relevant memory address from the source operand(s) and causes the data from that address within the memory 8 to be loaded into one of the control registers 10 specified by the destination operand. When loading to the data registers 16, load instructions act on both the control unit 2 and data processing unit 4. The address formation unit 14 computes the relevant memory address from the source operand(s) and causes data from that address within the memory 8 to be loaded into one of the data registers 16 specified by the destination operand.

As a simple example, consider load two instructions:
Load $r1, A1
Load $r2, A2

The first of these load instructions has one destination operand $r1, and one source operand field A1 (typically specified by $base+$offset). When executed it loads a word of data from memory address location A1 into register $r1. The second of these load instructions has one destination operand $r2 and one destination operand A2. When executed it loads a word of data from memory address location A2 into register $r2.

Once data is loaded into registers 10 or 16, then operations can be performed using the contents of those registers. If the instruction decoder 12 encounters a control instruction then it retains the instruction on the control path by executing it internally within the control unit 2 using the control unit's own internal logic and values in the control registers 10. If on the other hand the instruction decoder 12 encounters a data processing instruction, it diverts the instruction onto the data processing path by supplying the decoded opcode to the data processing logic 18 of the data processing unit 4 and supplying the decoded operand or operands in the form of one or more operand register addresses to the set of data registers 16. Alternatively one or more of the operand(s) 30 may be immediate (literal) values. A data processing instruction 26 is illustrated schematically in FIG. 2b.

Referring to the example above, supposing $r1 and $r2 are data registers in the data register set 16, then data processing instructions can operate on them. For illustrative purposes, some simple examples would be:
Not $d1, $r1
Add $d2, $r1, $r2

The first of these data processing instructions has one source operand $r1 and one destination operand $d1. When executed it takes the bitwise complement of the value in register $r1 and places the result in a destination register $d1 of the data register set 16. The second of these data processing instructions has two source operands $r1 and $r2, and one source operand $d2. When executed it adds the contents of registers $r1 and $r2 and places the result in a destination register $d2 of the data register set 16.

The result of a data processing operation can be stored from the destination within data register set 16 into the data memory 8 by means of store instructions, and/or operated on again by means of further data processing instructions. Ultimately the results of such data processing will be output from registers 16 and/or data memory 8 to an external device, e.g. to output a decoded audio or visual signal to a speaker or screen in cases such as the processing of incoming signals received over a wireless communication system, or to transmit an encoded signal for transmission over a wireless communication system, or to manipulate a radio-frequency (RF) front end for transmitting such wireless signals.

The control and data paths may have instruction set architectures with asymmetric instruction widths, and may have asymmetric register and processing path widths. The rationale is that control code favours shorter, simpler instructions; whereas data processing code favours a larger, more specialised instruction set and vector data values requiring wider data registers.

To improve the amount of data processed per unit time, the processor may be arranged with some degree of parallelism.

Figure 2C:
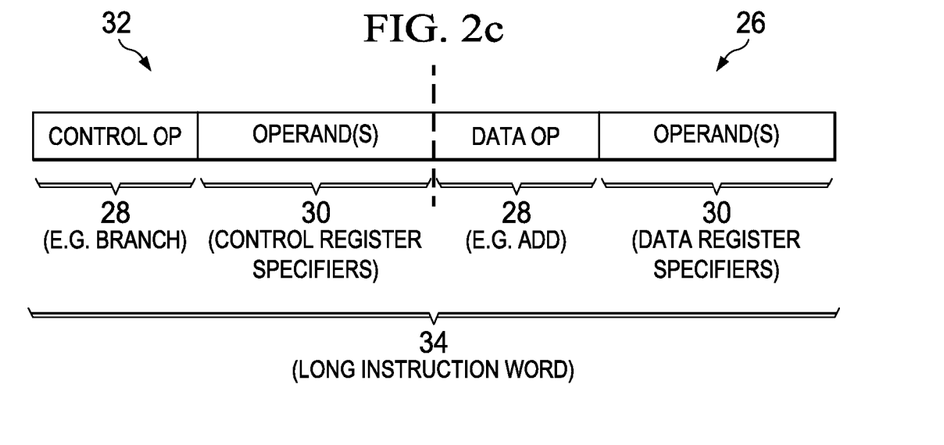
FIG. 2c is a schematic representation of a long instruction word.

Referring to FIG. 2c, one example of parallelism is "long instruction word" (LIW) type processing. For instance in the illustrated processor, the fetch circuitry of the control unit 2 may fetch multiple instructions at a time in the form of instruction packets, each packet comprising a plurality of constituent instructions, and each instruction comprising its own respective opcode 28 and associated operand(s) 30 for performing its own respective operation. A suitable program compiler can identify (for example) pairs of instructions which can be executed in parallel, and arrange such pairs into packets in instruction memory for atomic execution. The compiler guarantees that there are no data dependencies between the instructions within a packet, so the machine need not check for such dependencies and can execute the constituent instructions simultaneously or in any order with respect to each other, provided execution is ordered with respect to other packets. Such packets may be referred to as a long instruction word (sometimes also called a "Very Long Instruction Word", VLIW, especially if there are more than two instructions in each atomic packet). So in the illustrated processor, if the packet comprises a control instruction 32 and a data processing instruction 26, then the instruction decoder 12 directs them in parallel to the control unit 2 and data processing unit 4 respectively for parallel execution by those respective units (although if for example the packet comprises only control instructions then these may have to be executed sequentially).

Note therefore that it is not strictly accurate to refer to an "LIW instruction", but rather an LIW packet. Each LIW packet in fact comprises multiple instructions, in the sense of an instruction being a discrete unit of code comprising a single opcode and any associated respective operands.

Figure 2D:
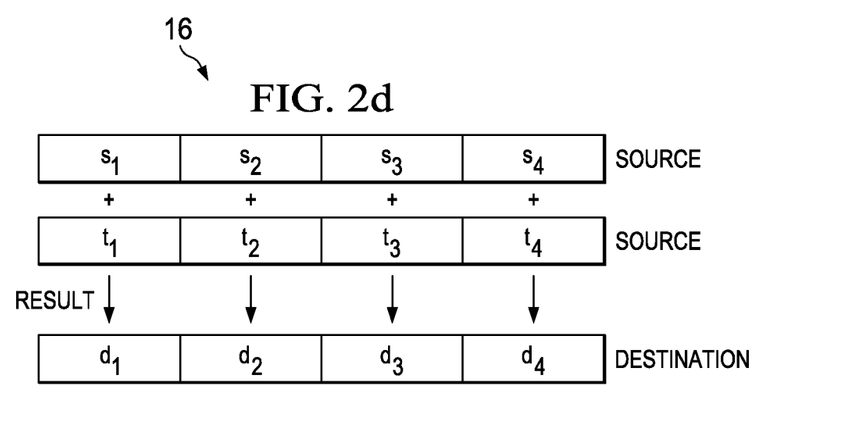
FIG. 2d is a schematic representation of a vector operation.

Referring to FIG. 2d, another example of parallelism is a type of vector processing referred to as SIMD (single instruction, multiple data) processing. According to a SIMD arrangement, rather than a single data element, each data register in the set 16 is able to hold a vector comprising a plurality of constituent data elements. The data processing logic 18 and memory load/store pathways operate on each element of the short vector operands substantially in parallel, in response to a single shared opcode. That is, a single load instruction can load a whole vector into a vector register of the set 16, and a single data processing operation (with a single opcode) can cause the data processing logic 18 to perform the same operation substantially simultaneously on each element of the loaded vector. For example, as shown schematically in FIG. 2d, if a first source register s holds a vector $(s_1, s_2, s_3, s_4)$ and a second source register t holds a vector $(t_1, t_2, t_3, t_4)$, then a single add instruction (comprising a single opcode and specifying only the two source registers s, t and a single destination register d) will operate to add the individual elements of the two source vectors and store the elements of the resulting vector $(s_1+t_1, s_2+t_2, s_3+t_s, s_4+t_4)$ to respective elements of the destination register d, i.e. to $(d_1, d_2, d_3, d_4)$ respectively.

Other forms of parallelism are also known, e.g. by means of superscalar processors. These are similar to LIW type processors in that they execute multiple instructions in parallel, except that they comprise additional hardware to detect and avoid dependency conflicts between the parallel instructions (whereas LIW processors require dependency conflicts to be avoided in advance by the compiler).

SUMMARY

According to one aspect, disclosed herein is a processor. In one embodiment, the processor includes: (1) a decode unit arranged to receive a sequence of instructions, (2) a first and at least a second data processing channel each coupled to the decode unit, the second data processing channel comprising enable logic configured to selectively enable the second data processing channel, (3) variable offset addressing logic coupled to the decode unit, configured to generate first and second storage addresses having a variable offset therebetween based on a same one or more address operands of a same storage access instruction and (4) storage access circuitry coupled to the variable offset addressing logic and to the first and second data processing channels, configured to transfer data between the first storage address and a register of the first data processing channel and to transfer data between the second storage address and a corresponding register of the second data processing channel based on a same one or more register specifier operands of the storage access instruction. The decode unit is configured to supply a same opcode and a same one or more operands of a same data processing instruction to both the first and second data processing channels, such that the first data processing channel performs an operation specified by that opcode on data in one or more registers of the first data processing channel, and on condition of being enabled the second data processing channel performs the same operation on data in a corresponding one or more registers of the second data processing channel based on the same one or more operands of the data processing instruction.

According to another aspect, a wireless user terminal is disclosed. In one embodiment, the wireless user terminal includes: (1) a processor and a (2) memory. The processor includes: (1A) a decode unit arranged to receive a sequence of instructions, (1B) a first and at least a second data processing channel each coupled to the decode unit, the second data processing channel comprising enable logic configured to selectively enable the second data processing channel, (1C) variable offset addressing logic coupled to the decode unit, configured to generate first and second storage addresses having a variable offset therebetween based on a same one or more address operands of a same storage access instruction and (1D) storage access circuitry coupled to the variable offset addressing logic and to the first and second data processing channels, configured to transfer data between the first storage address and a register of the first data processing channel and to transfer data between the second storage address and a corresponding register of the second data processing channel based on a same one or more register specifier operands of the storage access instruction. The decode unit is configured to supply a same opcode and a same one or more operands of a same data processing instruction to both the first and second data processing channels, such that the first data processing channel performs an operation specified by that opcode on data in one or more registers of the first data processing channel, and on condition of being enabled the second data processing channel performs the same operation on data in a corresponding one or more registers of the second data processing channel based on the same one or more operands of the data processing instruction. The memory is coupled to the addressing logic and stores data representing wireless signals received by the wireless user terminal. The decode unit is arranged to receive a sequence of instructions for performing signal processing on that data.

BRIEF DESCRIPTION

Reference is now made to the following descriptions taken in conjunction with the accompanying drawings, in which.

DETAILED DESCRIPTION

The disclosure provides improved data processing performance of a processor by extending the parallelism of a processor. Disclosed herein are embodiments to increase the data computation performance of a processor by doubling (or more than doubling) the data compute and storage resources of the processor without significant enlargement of the processor control hardware or program memory and without significant modifications to the processor's instruction set architecture. The embodiments disclosed herein advantageously allows a processor to selectively use the same portion of code to operate on multiple different portions of data, the different portions of data being offset in memory by some controllable amount.

In some embodiments, each of the data processing channels may be a vector processing channel, such that the data transferred to or from each of the first and second storage addresses is a respective vector comprising a plurality of data elements, and the operation performed within each of the first and second data processing channels comprises a vector processing operation performed on each of the plurality of data elements in response to the same opcode.

In further embodiments, the address offset logic may comprise a programmable offset register for storing the variable offset, the programmable offset register being arranged to be written under program control.

Further, the variable offset addressing logic may be configured to generate first and second load addresses having a variable load offset therebetween based on a same one or more address operands of a same load instruction, and to generate first and second store addresses having a variable store offset therebetween based on a same one or more address operands of a same store instruction; the storage access circuitry may be configured to load data from the first load address into a register of the first data processing channel and to load data from the second load address into a corresponding register of the second data processing channel based on a same one or more register specifier operands of the load instruction; and the storage access circuitry may be further configured to store data from a register of the first data processing channel to the first store address and to store data from a corresponding register of the second data processing channel to the second store address based on a same one or more register specifier operands of the store instruction.

The variable offset addressing logic may comprise separate programmable offset registers for load and store operations, one for storing the variable load offset and one for storing the variable store offset. Alternatively the variable load and store offsets may be the same offset value stored in the same programmable offset register.

The variable offset addressing logic may comprise further decoding logic configured to determine the offset from a field of the storage access instruction.

The first storage address may be identified by the one or more address operands of the storage access instruction, and the variable offset addressing logic may be configured to generate the second storage address by applying the variable offset to the first storage address.

The enable logic may comprise a programmable enable register for storing at least one enable bit, and may be configured to selectively enable the second data processing channel in dependence on the enable bit.

The enable logic may comprise further decoding logic configured to selectively enable the second data processing channel in dependence on at least one enable bit in the data processing instruction.

The first data processing channel may comprise first data processing logic and a set of first data registers. The second data processing channel may comprise second data processing logic and a second set of data registers. The variable offset addressing logic may be configured to generate first and second storage addresses having a variable offset therebetween based on a same one or more source address operands of a same load instruction. Additionally, the storage access circuitry may be configured to load data from the first storage address into one or more of the first data registers specified by one or more destination register specifier operands of the same load instruction, and to load data from the second storage address into a corresponding one or more of the second data registers specified by the same one or more destination register specifier operands of the same load instruction. This may be done such that the first data processing logic performs an operation specified by the opcode on the data loaded from the first storage address into the specified first data register, and on condition that the second execution channel is enabled the second data processing logic performs the same operation on the data loaded from the second storage address into the corresponding second data register.

The one or more operands of the data processing instruction may include one or more source operands and the first data processing channel may be configured to select the specified first data register as a source for the operation performed by the first data processing logic based on the one or more source operands of the data processing instruction. The second data processing channel may be configured to select the corresponding second data register as a source for the same operation performed by the second data processing logic based on the same source operand of the same data processing instruction.

The one or more operands of the data processing instruction may include at least one destination operand. Additionally, the storage access circuitry may be further configured to store data from a further of the first data registers to the first store address and to store data from a corresponding one of the second data registers to the second store address. The first data processing channel may also be configured to select the further first register as a destination for a result of the operation performed by the first data processing logic based on the destination operand of the data processing instruction, and the second data processing channel may be configured to select the corresponding second data register as a destination for a result of the operation performed by the second data processing logic based on the same destination operand of the same data processing instruction.

The variable offset addressing logic may be configured, in response to each of a plurality of storage access instructions, to generate first and second storage addresses having a variable offset therebetween based on the same one or more address operands of the same respective storage access instruction. The storage access circuitry may be configured, in response to each of the storage access instructions, to transfer data between the respective first storage address into a respective register of the first data processing channel and to transfer data between the respective second storage address and a respective corresponding register of the second data processing channel based on the same respective register specifier operand. The decode unit may be configured to supply the same opcode and the same plurality of source operands of the same data processing instruction to both the first and second data processing channels, such that the first data processing logic performs an operation specified by that opcode on data in a register of the first data processing channel, and on condition of being enabled the second data processing logic performs the same operation on data in a corresponding register of the second data processing channel based on the same one or more operands of the data processing instruction.

The processor may comprise a data execution path for executing data processing instructions and a separate control execution path for executing control instructions, the data execution path being formed of the first and second or more data processing channels.

The decode unit may be arranged to receive a sequence of instruction packets each comprising a plurality of constituent instructions, at least some of the instruction packets each comprising a long instruction word formed of a control instruction and a data processing instruction, and the decode unit being configured upon decoding a long instruction word to supply the control instruction to the control path for execution and to supply the data processing instruction to the data processing channels of the data processing path for execution in parallel with the control instruction.

Each of the data processing channels may include data processing logic in the form of a configurable execution unit, configurable to perform a plurality of constituent operations in response to the same opcode.

The second or more data processing channels may provide a fourth dimension of parallelism orthogonal to the vector processing, long instruction word execution, and configurable execution.

The processor may comprise a plurality of second data processing channels in parallel with the first data processing channel, wherein the storage access circuitry may be configured to transfer data between each second data processing channel and a respective second storage address. Each second data processing channel may perform the same operation on the data of the respective second storage address.

The variable offset addressing logic may be configured to generate a first storage address and a plurality of different second storage addresses, each for a respective one of the data processing channels, but derived from a common variable offset. The variable offset addressing logic may be configured to generate a first storage address and a plurality of independent second storage addresses each derived from an independently variable offset for each of the second data processing channels.

The second data processing channels may be arranged to be commonly enabled by a common enable bit or bits. Each second data processing channel may be arranged to be independently enabled and disabled by a respective enable bit or bits.

A processor disclosed herein includes a decode unit arranged to receive a sequence of instructions and a first and at least a second data processing channel each coupled to the decode unit, the second data processing channel comprising enable logic configured to selectively enable the second data processing channel. The decode unit is configured to supply a same opcode and a same one or more operands of a same data processing instruction to both the first and second data processing channels, such that the first data processing channel performs an operation specified by that opcode using one or more registers of the first data processing channel, and on condition of being enabled the second data processing channel performs the same operation using a corresponding one or more registers of the second data processing channel based on the same one or more operands of the data processing instruction. In this aspect the involvement of the variable offset addressing logic and/or storage access circuitry may be optional, such that the disclosure may also be applied to register-only type operations.

A processor is also disclosed that includes a plurality of data processing channels, each of the data processing channels comprising vector processing logic. The data processing channels are arranged, in response to the same instructions, to operate substantially in parallel on vectors from respective memory locations offset from one another by a programmable offset value. At least one of the data processing channels is arranged to be selectively enabled and disabled independently of at least one other of the data processing channels. A dual or multi SIMD channel processor is also disclosed.

The disclosure also provides a wireless user terminal comprising a processor having any of the above features, such as a decode unit, and a memory coupled to the addressing logic. The memory stores data representing wireless signals received by the wireless user terminal. The decode unit being arranged to receive a sequence of instructions for performing signal processing on that data. In some embodiments, the sequence of instructions is configured to perform at least one of a trellis decoding operation and a fast Fourier transform.

A computer program product comprising code embodied on a non-transient computer-readable medium is also disclosed. The comprising code is configured to program the variable address offset of a processor having any of the above features.

Figure 3:
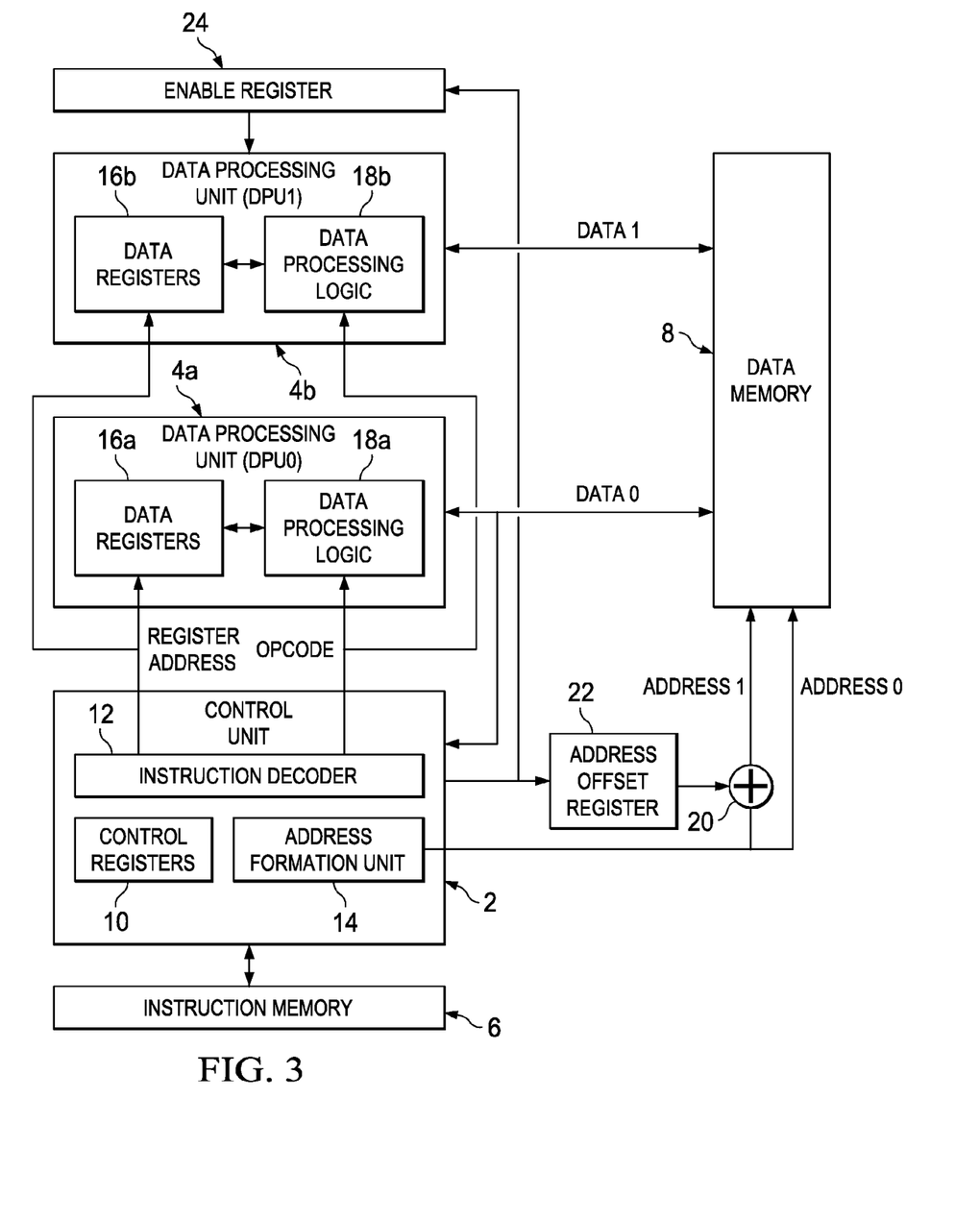
FIG. 3 is schematic block diagram of a dual data channel processor.

One embodiment of an improved processor is schematically illustrated in the block diagram of FIG. 3.

The processor comprises a dual path architecture similar to that of FIG. 1, whereby an instruction stream is divided between two different hardware execution paths: a control execution path which is dedicated to processing control code, and a data execution path which is dedicated to processing data (again see WO 2005/096141).

However, in addition to this dual data and control path architecture, the data processing path itself sub-comprises at least two duplicated data processing channels.

Over and above the processor of FIG. 1, the disclosed embodiments add the following features (shown bold in FIG. 3):

(a) a second (or more) data processing unit 4b (DPU1) which is responsive to the same opcode and register address(es) as the first data processing unit 4a (DPU0);
(b) a second access port to the data memory 8 (comprising inputs arranged to receive Data1 and Address1), implemented either by dual-ported memory circuits or by a collision-free banking arrangement within the data memory 8;
(c) a (multi-bit) address offset register 22 which can be programmed by control instructions, and an adder 20 which forms the second address (address') by adding the address offset to the original address (Address0) which is computed by the address formation unit 14; and
(d) a (Boolean) enable register 24 which can be programmed by control instructions, and which can cause the second data processing unit 4b (DPU1) to be either responsive or not responsive to the register address(es) and opcode shared with the first data processing unit 4a (DPU0). The enable register 24 may also control the second memory port and the address offset adder 20, so that they do not waste power when the second data processing unit 4b (DPU1) is disabled (for read operations it would waste power, and for write operations it could corrupt the memory state).

Referring in more detail to FIG. 3, the processor comprises: a control processing path in the form of a control unit 2; and an enhanced, dual-channel data processing path comprising a first data processing channel in the form of a first constituent data processing unit 4a (DPU0) and a second, parallel data processing channel in the form of a second constituent data processing unit 4b (DPU1). The first data processing unit DPU0 comprises first data processing logic 18a coupled to a respective associated first set of data registers 16a; and the second data processing unit DPU1 comprises second, parallel data processing logic 18b coupled to a respective associated second set of data registers 16b. The first and second data processing channels may be substantially identical, each being a respective instance of a vector processing unit configured to perform vector processing. Thus the processor comprises two (or more) substantially parallel vector processing channels, thus adding an extra dimension of parallelism in addition to (SIMD) vector processing.

In addition to the connections described in relation to FIG. 1, the instruction decoder 12 of the control unit 2 is coupled to both the first set of data registers 16a of the first data processing unit DPU0 and the second set of data registers 16b of the second data processing unit DPU1, and is arranged to supply the same register address or addresses from the one or more operands of the same instruction to both of the data processing units DP0 and DP1 substantially in parallel. The instruction decoder 12 is also coupled to both the first data processing logic 18a of the first data processing unit DPU0 and the second data processing logic 18b of the second data processing unit DPU1, and is arranged to supply the same opcode from the same instruction to both of the data processing units DP0 and DP1 substantially in parallel.

Note therefore the distinction between, on the one hand, the dual data and control paths which perform different types of operation in response to executing different instructions with different opcodes; and on the other hand, the dual data processing channels within the data processing path which execute the same instruction and perform the same operation substantially simultaneously.

The processor further comprises an address offset register 22 and an adder 20. The address offset register has an input coupled to the control unit 2 and an output coupled to one input of the adder 20. The other input of the adder 20 is coupled to the output of the address formation unit.

Figure 4:
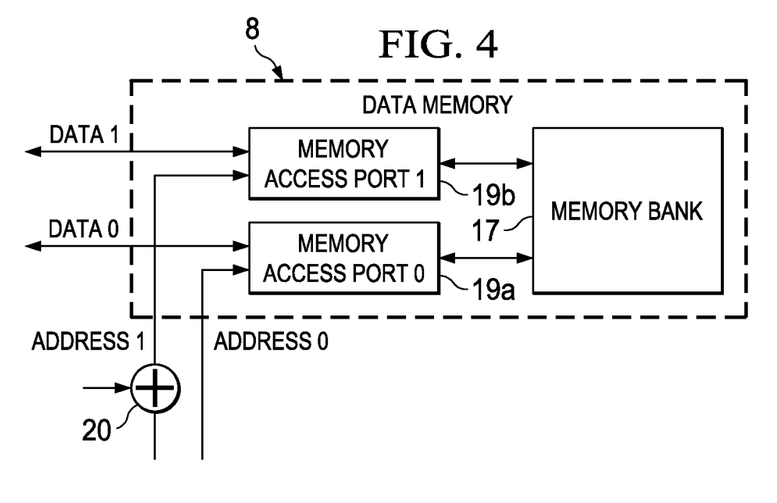
FIG. 4 is a schematic block diagram of a dual ported data memory.

Referring to FIG. 4, the output of the data memory 8 in the illustrated embodiment comprises a memory bank 17 (i.e. the actual array of memory cells where data is stored); and two memory ports, a first memory port 19a and a second memory port 19b, each coupled to the memory bank 17. The first memory port 19a is coupled to the output of the address formation unit 14 and to the first set of data registers 16a in the first data processing unit DPU0, and the second memory port 19b is coupled to the output of the adder 20 and to the second set of data registers 16b in the second data processing unit 16b. As mentioned, these two ports may be implemented either by dual-ported memory circuits or by a collision-free banking arrangement within the data memory 8.

In operation, the effect of the additional described circuitry is that when a load instruction is executed, then the one source address (Address0) specified explicitly by the source operand field (of that load instruction is also used to implicitly generate an additional second source address (Address1). That is, in response to the load instruction, the address formation unit 14 supplies the first address (Address0) to the first memory port 19a, but also to the adder 20. The adder 20 generates a second address (Address1) by adding an offset value stored in the address offset register 22 to the first address (Address0) and supplies the second address to the second memory port 19b. In response, the first memory port 19a retrieves data from the first address within the memory bank 17 of the data memory 8 and loads it into the specified register of the first data register set 16a, whilst the second memory port 19b retrieves data from the offset second address within the memory bank 17b and loads it into the specified register of the second data register set 16b (this being the register having the same register address within the second set 16b as the first specified register within the first set 16a).

Note that the source operand field of the load instruction may in fact specify Address0 in the form of a sum of a base register and an offset register, each indicated by source constituent operands of that load instruction. In this case the offset added by the offset register 22 and adder 20 to create Address1 is an additional offset on top of that.

When a data processing operation is subsequently performed, the result is that a single data processing instruction (with single opcode and single instance of the associated operand or operands) will operate on the relevant data loaded into both the first set of data registers 16a and second set of data registers 16b. Having been loaded from offset addresses in the memory 8, this means that a single instruction performs the same operation on different portions of data, advantageously allowing the same code to be re-used on multiple portions of data.

It will be appreciated that a similar arrangement applies to memory store operations, wherein register values from each of DPU0 and DPU1 are stored to two separate locations in memory, separated by the address offset value 22. In some implementations a different offset may be used for stores than is used for loads, so there are two offset registers 22. In other embodiments a single offset value from a single register may be used for both loads and stores.

In one implementation, DPU1 may receive and executes the opcode a fixed number of clock cycles later than DPU0. This implementation detail allows time to calculate the offset address, and to buffer the decoded opcode and register addresses sent to DPU1, and optionally to power-gate or clock-gate DPU1.

The address offset register 20 may be configured to be programmable, e.g. by being made addressable by generic load instructions. Alternatively, a special kind of load instruction could be included in the instruction set architecture, with a field which specifies the offset for that load, or the address of a register containing the offset.

The processor further comprises a one-bit enable register 24 coupled between to the logic of the control unit 2 and the second data processing unit DPU1. When the enable bit is set (asserted), the dual data processing units DPU0 and DPU1 both operate to perform parallel data processing in the manner described above in relation to FIGS. 3 and 4. When the enable bit is not set (is de-asserted), then the first data processing unit DPU0 operates alone as described in relation to FIG. 1 and the second data processing unit DPU1 is disabled.

The enable register 24 may be configured to be programmable, e.g. again by being made addressable by generic load instructions, or by including a special toggle instruction in the instruction set architecture. Alternatively, the instruction set architecture could be modified to include a special one-bit field in each relevant data processing instruction which triggers the control unit 2 to enable or disable the second data processing unit DPU1, allowing the second data processing unit DPU1 to be turned on and off on an instruction-by-instruction basis.

Figure 5:
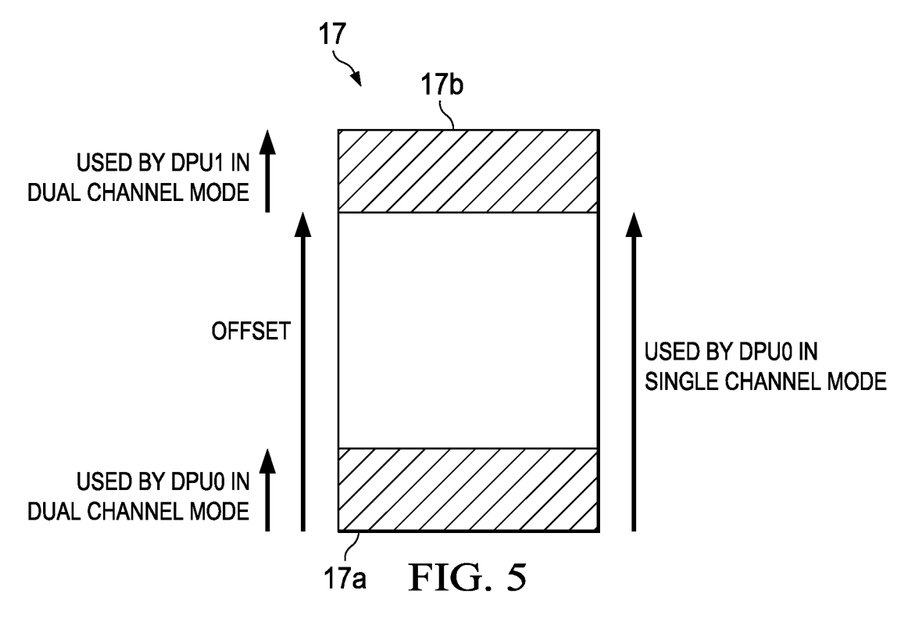
FIG. 5 is a schematic representation of an example memory allocation.

An example memory allocation is shown schematically in FIG. 5. Here, in dual channel mode when the enable bit is asserted in the enable register 24, then a first region of memory 17a is used to supply data for processing in the first data processing unit DPU0 and a second region of memory 17b is used to supply data for processing in the second data processing unit DPU1, the second region 17b being offset in address space from the first region 17a by a programmable value stored in the address offset register 22. In single channel mode on the other hand when the enable bit is de-asserted in the enable register 24, then potentially any region of memory minus the second region 17b is available for use by the first data processing unit DPU0.

Note that in addition to the parallelism provided by the dual data processing channel architecture disclosed herein, other types of parallelism may also be exploited.

In one embodiment, the processor may be arranged to perform LIW type processing whereby control and data instructions from a common instruction word 34 may be directed for parallel execution through the control and data paths respectively, similarly to the idea described in relation to FIG. 2d. In such embodiments, the control instruction 32 remains on the control path 2, but the data processing instruction 26 is diverted along the dual channel data processing path 4a,4b to potentially operate on both data processing units DPU0 and DPU1 in the manner disclosed herein.

Furthermore, in addition to the parallelism of the dual data channel processing channel architecture and in addition to the parallelism of the LIW architecture, each of the individual data processing units DPU0 and DPU1 may also be internally configured according to one or more further types of parallelism.

Each data processing unit DPU0 and DPU1 may be configured as an SIMD vector processing unit, such that each of the two duplicated operations comprise a vector operation on multiple data elements as described in relation to FIG. 2d. That is, a single load instruction loads two vectors from offset memory addresses within the memory 8: a first vector from the first memory address (Address0) is loaded into one of the first set of data registers 16a, and a second vector from the second, offset memory address (Address1) is loaded into one of the second set of data registers 16b. Thus a single instruction effectively loads a two dimensional matrix of data elements, rather than just a one dimensional vector as in a conventional SIMD processor. A single data processing instruction comprising a single opcode and associated operands may then operate substantially simultaneously on each element of the vectors loaded into both parallel channels.

Providing two (or more) vector processing units DPU0 and DPU1 in parallel thus creates what may be considered as a matrix processor, in which a single instruction can operate on a matrix of data elements.

Further, each data processing unit DPU0 and DPU1 may comprise a configurable "deep" execution unit as described for example in international patent application publication number WO 2006/117562. This may be considered to add another orthogonal dimension of parallelism, in the sense that multiple different kinds of constituent data processing operator units (e.g. multiply unit, ALU unit, shift/permute unit) can be configured to operate consecutively on the data issued by a single instruction before returning the result to the destination register. Thus a larger, more complex operation such as a Finite Impulse Response (FIR) operation can be set up to be triggered by a single instruction. The FIR operation comprises constituent operations of potentially many cascaded multiplications and additions. Other examples of a "deep" operation could include a Fast Fourier Transform (FFT), a trellis based encoding or decoding operation (e.g. Viterbi or Turbo), or a correlation.

Thus the dual channel processing architecture disclosed herein may be considered to provide a fourth dimension of parallelism, orthogonal to each of the parallelisms provided by LIW processing, by SIMD processing, and/or by configurable "deep" execution.

Some advantages that may be achieved according to the disclosure are as follows.

For a start, the second (or more) data processing unit can increase the effective SIMD width of the machine, allowing more computation or memory access work to be done for each processor cycle, in response to each instruction. There are many opportunities in, for example, the signal processing for cellular modems, to execute effectively the same instruction sequence on two different data-sets. This may be particularly advantageous in modems for Long Term Evolution (LTE) standards. For example, Turbo decoding may be executed on multiple data streams simultaneously, and the fast Fourier transforms (FFTs) required for orthogonal frequency division multiplexing (OFDM) may be executed on multiple data streams simultaneously.

The two (or more) data processing units access different regions of memory. Forming Address1 as an offset from Address0 advantageously avoids needing two address formation units in the control unit 2, and more importantly avoids any requirement for additional addressing information in each data processing instruction.

Making the offset programmable provides useful flexibility in the organization of data structures in memory. For example it allows the memory to be allocated as shown in FIG. 5, which usefully keeps the address space of DPU0 contiguous when the space required for DPU1 is less than half of memory. An enhancement to the disclosure may provide two different address offset registers 22, one used for loads and the other for stores.

As mentioned, an alternative arrangement would be for each suitable data processing or memory access instruction to include a field which either specifies the offset between Address0 and Address1, or specifies a control register which contains the offset to be used. This alternative is more flexible than using an address offset register, but is very expensive in instruction encoding space which is usually precious.

The ability to control the second path using the enable register 24 is valuable for two reasons.

The first reason is to save power when simultaneous calculation on two data sets is not required.

The second is that there are some signal processing tasks, for example Turbo decoding in 3G cellular modems, for which the same code sequence can sometimes usefully be applied to two data-sets simultaneously, and sometimes to only one data-set, during the course of running a program. To conserve Instruction memory space, which is invariably precious for an embedded processor, it is advantageous to be able to reuse exactly the same code procedure for these two situations—so the instructions themselves cannot distinguish whether they will control one or both data processing units DPU0 and/or DPU1. There is likewise a saving in software development cost if the same procedure is able to service both situations. Therefore the enable register 24 can be set (or cleared) before the code procedure is called, to determine whether the call will operate on one or both data processing units DPU0 and/or DPU1. An extension to a multi-bit enable for more than two data processing units is also an option.

An alternative arrangement would allocate a bit in the encoding of suitable data processing and data memory access instructions, to indicate whether one or both DPUs should respond to the instruction. There would then be no enable register. Such an alternative would lose the second point above of re-using the same code procedure, but would still be advantageous over existing processors, e.g. by increasing parallelism and therefore data processing performance per cycle.

It will be appreciated that the above embodiments have been described only by way of example.

For instance, the improvements disclosed herein need not necessarily be used in conjunction with the described dual path control and data processing, nor with LIW processing, nor with SIMD processing, nor configurable "deep" execution. The disclosed improvement may alternatively be used in conjunction with none or any combination of only some of these options. E.g. the control and data processing functions may be arranged in series along the same processing path, the execution units of the two data processing channels may only be scalar execution units, and/or those execution units may be fixed execution units.

Further, this disclosure is not limited to only a single additional data processing unit DPU1. In principle, there may be any number of further data processing units DPU2, DPU3, etc., thus creating multiple extra parallel data processing channels. In this case each additional data processing channel may be configured to use an address calculated from a common offset from a common address offset register, e.g. at intervals of the common offset in memory; or alternatively each may be configured to use its own independently programmable offset from its own respective one of a plurality of address offset registers. Similarly each additional data processing channel may be enabled and disabled together by a common enable bit or common enable logic; or each may be independently enabled and disabled by a respective enable bit or logic; or the enable logic may constrain the channels to being enabled an disabled in only certain patterns, e.g. selecting between predetermined arrangements of one, two, four or eight channels, etc.

Note that where operations or processing are described as being performed substantially simultaneously or in parallel, this does not necessarily require that the operations are aligned exactly in time. For example it is possible that pipeline stages in the form of clocked latches would be included along various signal paths, in which case there could be certain offset in time between the operations occurring on one parallel channel and another. The operations may be simultaneously in that they at least overlap in time, though depending on the pipelining it is possible that the time offset would be greater. Nonetheless, the two or more channels still provide parallel data processing in the sense that the hardware resources are duplicated on each of the two or more parallel channels (not scheduled in an interleaved fashion through the same channel). In the case where each of the two or more data processing channels is a respective instance of a vector processing channel, this means the vector processing hardware is duplicated on each of the two or more parallel vector processing channels, thus creating what may be considered a matrix processor.

Further, note that the term "word" as used in the present disclosure does not limit to any one particular length, but rather any length defined by a data width of the architecture in question. For example, "word" is sometimes used to refer to a 32 bit data entity, but in one embodiment the long instruction word packets 34 may be each 64 bits in length.

Note also that in general, operands of instructions may either be immediate (literal) operands or more usually may identify a register in which a value is stored. For example an address operand which specifies a load or store address may comprise two parts specifying a base plus an offset respectively, and each part may comprise either an immediate operand containing the base or offset directly or may identify a register storing that part of the address. Further, note that some operations use separate source and destination registers, whilst other types use a single register to contain both a source and a destination operand for the same instruction (for example an instruction with a single register specifier operand field that inverts all of the bits in the specified register).

Where the above has been described in terms of memory addresses and memory access, this is not necessarily intended to limit to any particular kind of memory and in general the disclosure may involve load and store operations to and from any storage address of any kind of electronic storage medium.

Other configurations and applications may be apparent to a person skilled in the art given the disclosure herein. The scope of the invention is not limited by the described embodiments, but only by the appendant claims.

The invention claimed is:

1. A processor comprising:
    a decode unit arranged to receive a sequence of instructions;
    a first and at least a second data processing channel each coupled to the decode unit, the second data processing channel comprising enable logic configured to selectively enable the second data processing channel;
    variable offset addressing logic coupled to the decode unit, configured to generate first and second storage addresses having a variable offset therebetween based on a same one or more address operands of a same storage access instruction; and
    storage access circuitry coupled to the variable offset addressing logic and to the first and second data processing channels, configured to transfer data between the first storage address and a register of the first data processing channel and to transfer data between the second storage address and a corresponding register of the second data processing channel based on a same one or more register specifier operands of the storage access instruction;
    wherein the decode unit is configured to supply a same opcode and a same one or more operands of a same data processing instruction to both the first and second data processing channels, such that the first data processing channel performs an operation specified by that opcode on data in one or more registers of the first data processing channel, and on condition of being enabled the second data processing channel performs the same operation on data in a corresponding one or more registers of the second data processing channel based on the same one or more operands of the data processing instruction; wherein each of said data processing channels is a vector processing channel, such that the data transferred to or from each of said first and second storage addresses is a respective vector comprising a plurality of data elements, and the operation performed within each of the first and second data processing channels comprises a vector processing operation performed on each of said plurality of data elements in response to said same opcode.

2. A computer program product comprising code embodied on a non-transient computer-readable medium for execution by a processor to perform a method for programming the variable address offset of a processor according to claim 1.

3. The processor of claim 1, wherein the address offset logic comprises a programmable offset register for storing said variable offset, the programmable offset register being arranged to be written under program control.

4. The processor of claim 1, wherein the address offset logic comprises a programmable offset register for storing said variable offset, the programmable offset register being arranged to be written under program control.

5. The processor of claim 1, wherein:
    the variable offset addressing logic is configured to generate first and second load addresses having a variable load offset therebetween based on a same one or more address operands of a same load instruction, and to generate first and second store addresses having a variable store offset therebetween based on a same one or more address operands of a same store instruction;
    the storage access circuitry is configured to load data from the first load address into a register of the first data processing channel and to load data from the second load address into a corresponding register of the second data processing channel based on a same one or more register specifier operands of the load instruction; and
    the storage access circuitry is further configured to store data from a register of the first data processing channel to the first store address and to store data from a corresponding register of the second data processing channel to the second store address based on a same one or more register specifier operands of the store instruction.

6. The processor of claim 1, wherein:
    the variable offset addressing logic is configured to generate first and second load addresses having a variable load offset therebetween based on a same one or more address operands of a same load instruction, and to generate first and second store addresses having a variable store offset therebetween based on a same one or more address operands of a same store instruction;
    the storage access circuitry is configured to load data from the first load address into a register of the first data processing channel and to load data from the second load address into a corresponding register of the second data processing channel based on a same one or more register specifier operands of the load instruction; and
    the storage access circuitry is further configured to store data from a register of the first data processing channel to the first store address and to store data from a corresponding register of the second data processing channel to the second store address based on a same one or more register specifier operands of the store instruction.

7. The processor of claim 3, wherein:
the variable offset addressing logic is configured to generate first and second load addresses having a variable load offset therebetween based on a same one or more address operands of a same load instruction, and to generate first and second store addresses having a variable store offset therebetween based on a same one or more address operands of a same store instruction;
the storage access circuitry is configured to load data from the first load address into a register of the first data processing channel and to load data from the second load address into a corresponding register of the second data processing channel based on a same one or more register specifier operands of the load instruction; and
the storage access circuitry is further configured to store data from a register of the first data processing channel to the first store address and to store data from a corresponding register of the second data processing channel to the second store address based on a same one or more register specifier operands of the store instruction.

8. The processor of claim 3, wherein:
the variable offset addressing logic comprises separate programmable offset registers for load and store operations, one for storing the variable load offset and one for storing the variable store offset.

9. The processor of claim 5, wherein:
the variable offset addressing logic comprises separate programmable offset registers for load and store operations, one for storing the variable load offset and one for storing the variable store offset.

10. The processor of claim 3, wherein the variable load and store offsets are the same offset value stored in the same programmable offset register.

11. The processor of claim 5, wherein the variable load and store offsets are the same offset value stored in the same programmable offset register.

12. The processor of claim 1, wherein the variable offset addressing logic comprises further decoding logic configured to determine the offset from a field of the storage access instruction.

13. The processor of claim 1, wherein the variable offset addressing logic comprises further decoding logic configured to determine the offset from a field of the storage access instruction.

14. The processor of claim 1, wherein the first storage address is identified by said one or more address operands of the storage access instruction, and the variable offset addressing logic is configured to generate the second storage address by applying the variable offset to the first storage address.

15. The processor of claim 1, wherein the enable logic comprises a programmable enable register for storing at least one enable bit, and is configured to selectively enable the second data processing channel in dependence on the enable bit.

16. The processor of claim 1, wherein the enable logic comprises further decoding logic configured to selectively enable the second data processing channel in dependence on at least one enable bit in the data processing instruction.

17. The processor of claim 14, wherein the enable logic comprises further decoding logic configured to selectively enable the second data processing channel in dependence on at least one enable bit in the data processing instruction.

18. The processor of claim 1, wherein:
the first data processing channel comprises first data processing logic and a set of first data registers;
the second data processing channel comprises second data processing logic and a second set of data registers;
the variable offset addressing logic is configured to generate first and second storage addresses having a variable offset therebetween based on a same one or more source address operands of a same load instruction; and
the storage access circuitry is configured to load data from the first storage address into one or more of the first data registers specified by one or more destination register specifier operands of said same load instruction, and to load data from the second storage address into a corresponding one or more of the second data registers specified by the same one or more destination register specifier operands of the same load instruction;
such that the first data processing logic performs an operation specified by said opcode on the data loaded from the first storage address into the specified first data register, and on condition that the second execution channel is enabled the second data processing logic performs the same operation on the data loaded from the second storage address into said corresponding second data register.

19. The processor of claim 18, wherein:
said one or more operands of the data processing instruction include one or more source operands; and
the first data processing channel is configured to select the specified first data register as a source for the operation performed by the first data processing logic based on said one or more source operands of the data processing instruction, and the second data processing channel is configured to select said corresponding second data register as a source for the same operation performed by the second data processing logic based on said same source operand of the same data processing instruction.

20. The processor of claim 5, wherein:
said one or more operands of the data processing instruction include at least one destination operand;
the storage access circuitry is further configured to store data from a further of said first data registers to the first store address and to store data from a corresponding one of the second data registers to the second store address; and
the first data processing channel is configured to select the further first register as a destination for a result of the operation performed by the first data processing logic based on said destination operand of the data processing instruction, and the second data processing channel is configured to select the corresponding second data register as a destination for a result of the operation performed by the second data processing logic based on said same destination operand of the same data processing instruction.

21. The processor of claim 18, wherein:
said one or more operands of the data processing instruction include at least one destination operand;
the storage access circuitry is further configured to store data from a further of said first data registers to the first store address and to store data from a corresponding one of the second data registers to the second store address; and
the first data processing channel is configured to select the further first register as a destination for a result of the operation performed by the first data processing logic based on said destination operand of the data processing instruction, and the second data processing channel is configured to select the corresponding second data register as a destination for a result of the operation performed by the second data processing logic based on said same destination operand of the same data processing instruction.

22. The processor of claim 19, wherein:
said one or more operands of the data processing instruction include at least one destination operand;
the storage access circuitry is further configured to store data from a further of said first data registers to the first store address and to store data from a corresponding one of the second data registers to the second store address; and
the first data processing channel is configured to select the further first register as a destination for a result of the operation performed by the first data processing logic based on said destination operand of the data processing instruction, and the second data processing channel is configured to select the corresponding second data register as a destination for a result of the operation performed by the second data processing logic based on said same destination operand of the same data processing instruction.

23. The processor of claim 1, wherein:
the variable offset addressing logic is configured, in response to each of a plurality of storage access instructions, to generate first and second storage addresses having a variable offset therebetween based on the same one or more address operands of the same respective storage access instruction;
the storage access circuitry is configured, in response to each of said storage access instructions, to transfer data between the respective first storage address into a respective register of the first data processing channel and to transfer data between the respective second storage address and a respective corresponding register of the second data processing channel based on the same respective register specifier operand;
the decode unit is configured to supply the same opcode and the same plurality of source operands of the same data processing instruction to both the first and second data processing channels, such that the first data processing logic performs an operation specified by that opcode on data in a register of the first data processing channel, and on condition of being enabled the second data processing logic performs the same operation on data in a corresponding register of the second data processing channel based on the same one or more operands of the data processing instruction.

24. The processor of claim 1, comprising a data execution path for executing data processing instructions and a separate control execution path for executing control instructions, the data execution path being formed of said first and second or more data processing channels.

25. The processor of claim 24, wherein: the decode unit is arranged to receive a sequence of instruction packets each comprising a plurality of constituent instructions, at least some of the instruction packets each comprising a long instruction word formed of a control instruction and a data processing instruction, and the decode unit being configured upon decoding a long instruction word to supply the control instruction to the control path for execution and to supply the data processing instruction to the data processing channels of the data processing path for execution in parallel with the control instruction.

26. The processor of claim 1, wherein each of said data processing channels comprises data processing logic in the form of a configurable execution unit, configurable to perform a plurality of constituent operations in response to said same opcode.

27. The processor of claim 1, such that said second data or more processing channels provide a fourth dimension of parallelism orthogonal to said vector processing, long instruction word execution, and configurable execution.

28. The processor of claim 25, such that said second data or more processing channels provide a fourth dimension of parallelism orthogonal to said vector processing, long instruction word execution, and configurable execution.

29. The processor of claim 26, such that said second data or more processing channels provide a fourth dimension of parallelism orthogonal to said vector processing, long instruction word execution, and configurable execution.

30. The processor of claim 1, comprising a plurality of second data processing channels in parallel with the first data processing channel;
wherein the storage access circuitry is configured to transfer data between each second data processing channel and a respective second storage address; and
each second data processing channel performs the same operation on the data of the respective second storage address.

31. The processor of claim 30, wherein the variable offset addressing logic is configured to generate a first storage address and a plurality of different second storage addresses, each for a respective one of said data processing channels, but derived from a common variable offset.

32. The processor of claim 30, wherein the variable offset addressing logic is configured to generate a first storage address and a plurality of independent second storage addresses each derived from an independently variable offset for each of said second data processing channels.

33. The processor of claim 30, wherein the second data processing channels are arranged to be commonly enabled by a common enable bit or bits.

34. The processor of claim 31, wherein the second data processing channels are arranged to be commonly enabled by a common enable bit or bits.

35. The processor of claim 32, wherein the second data processing channels are arranged to be commonly enabled by a common enable bit or bits.

36. The processor of claim 30, wherein each second data processing channel is arranged to be independently enabled and disabled by a respective enable bit or bits.

37. The processor of any of claim 31, wherein each second data processing channel is arranged to be independently enabled and disabled by a respective enable bit or bits.

38. The processor of any of claim 32, wherein each second data processing channel is arranged to be independently enabled and disabled by a respective enable bit or bits.

39. The processor of any of claim 33, wherein each second data processing channel is arranged to be independently enabled and disabled by a respective enable bit or bits.

40. A wireless user terminal comprising:
a processor including:
a decode unit arranged to receive a sequence of instructions,
a first and at least a second data processing channel each coupled to the decode unit, the second data processing channel comprising enable logic configured to selectively enable the second data processing channel,
variable offset addressing logic coupled to the decode unit, configured to generate first and second storage addresses having a variable offset therebetween based on a same one or more address operands of a same storage access instruction, and
storage access circuitry coupled to the variable offset addressing logic and to the first and second data processing channels, configured to transfer data between the first storage address and a register of the first data processing channel and to transfer data between the second storage address and a corresponding register of the second data processing channel based on a same one or more register specifier operands of the storage access instruction, wherein the decode unit is configured to supply a same opcode and a same one or more operands of a same data processing instruction to both the first and second data processing channels, such that the first data processing channel performs an operation specified by that opcode on data in one or more registers of the first data processing channel, and on condition of being enabled the second data processing channel performs the same operation on data in a corresponding one or more registers of the second data processing channel based on the same one or more operands of the data processing instruction; and a memory coupled to said addressing logic, the memory storing data representing wireless signals received by the wireless user terminal and the decode unit being arranged to receive a sequence of instructions for performing signal processing on that data;

wherein each of said data processing channels is a vector processing channel, such that the data transferred to or from each of said first and second storage addresses is a respective vector comprising a plurality of data elements and the operation performed within each of the first and second data processing channels comprises a vector processing operation performed on each of said plurality of data elements in response to said same opcode.

41. The processor of claim 40, wherein the sequence of instructions performs at least one of a trellis decoding operation and a fast Fourier transform.

* * * * *